(12) United States Patent  
Milton

(10) Patent No.: US 7,916,319 B2  
(45) Date of Patent: Mar. 29, 2011

(54) PRINTING MANAGEMENT SYSTEM

(75) Inventor: Bruce F. Milton, Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 1047 days.

(21) Appl. No.: 11/687,277

(22) Filed: Mar. 16, 2007

(65) Prior Publication Data

US 2008/0225328 A1    Sep. 18, 2008

(51) Int. Cl.
*G06F 15/00* (2006.01)
*G06F 15/16* (2006.01)

(52) U.S. Cl. ........................................ 358/1.14; 709/203

(58) Field of Classification Search ............... 358/1.14, 358/1.13, 1.15, 1.16, 1.18, 3.28, 474; 709/229, 709/217, 203, 204; 382/100, 321, 115, 305, 382/229, 135, 137; 715/738, 863, 252, 249; 455/557, 3.06
See application file for complete search history.

(56) References Cited

U.S. PATENT DOCUMENTS

| | | | |
|---|---|---|---|
| 5,579,031 A | 11/1996 | Liang | |
| 5,963,641 A * | 10/1999 | Crandall et al. | 380/2 |
| 6,043,909 A | 3/2000 | Holub | |
| 6,157,735 A | 12/2000 | Holub | |
| 6,466,328 B1 | 10/2002 | Bradley et al. | |
| 6,573,910 B1 | 6/2003 | Duke et al. | |
| 6,611,348 B1 | 8/2003 | Chase et al. | |
| 6,611,349 B1 | 8/2003 | Vogt et al. | |
| 6,738,155 B1 | 5/2004 | Rosenlund et al. | |
| 6,748,471 B1 | 6/2004 | Kenney et al. | |
| 6,859,832 B1 | 2/2005 | Gecht et al. | |
| 6,866,434 B2 | 3/2005 | Schuppan | |
| 6,873,435 B1 | 3/2005 | Tehranchi et al. | |
| 6,967,735 B2 | 11/2005 | Catt et al. | |
| 6,978,299 B1 | 12/2005 | Lodwick | |
| 6,992,786 B1 | 1/2006 | Breding et al. | |
| 6,995,870 B2 | 2/2006 | Holub | |
| 7,016,085 B2 | 3/2006 | Gonzalez et al. | |
| 2001/0052998 A1 | 12/2001 | Kiyosu et al. | |
| 2002/0060806 A1 | 5/2002 | Gassho et al. | |
| 2002/0093679 A1 | 7/2002 | Brady | |
| 2002/0154325 A1 | 10/2002 | Holub | |
| 2002/0181017 A1 | 12/2002 | Such et al. | |
| 2003/0020703 A1 | 1/2003 | Holub | |
| 2003/0020973 A1 | 1/2003 | Kondo | |

(Continued)

FOREIGN PATENT DOCUMENTS

EP    1 079 593    2/2001

(Continued)

*Primary Examiner* — Saeid Ebrahimi Dehkordy

(74) *Attorney, Agent, or Firm* — Nelson Adrian Blish

(57) ABSTRACT

A remote proofing system (10) on an information network (400) includes a networked controller (20) configured to be a master proofing controller and at least one remote proof printer (30, 90, 300, 310, 320, 330). The master proofing controller monitors at least one monitored information folder (13) maintained on the information network, associating a set of associated printer instructions (15) with the at least one monitored information folder, and instructing the at least one remote proof printer to print according to the set of associated printer instructions the contents of a proof printing file set when the proof printing file set is deposited in the at least one monitored information folder. Further embodiments of the remote proofing system allow for performing print proofing through an information firewall (800) via layered authorization from the operator of the remote proof printer; and multiple and partially overlapping remote proofing systems on the same information network.

21 Claims, 7 Drawing Sheets

U.S. PATENT DOCUMENTS

| | | |
|---|---|---|
| 2003/0080998 A1 | 5/2003 | Gonzalez |
| 2003/0147108 A1 | 8/2003 | Gonzalez et al. |
| 2003/0174347 A1 | 9/2003 | Gonzalez et al. |
| 2004/0024814 A1 | 2/2004 | Takeo et al. |
| 2004/0141192 A1 | 7/2004 | Jodra et al. |
| 2004/0190057 A1 * | 9/2004 | Takahashi et al. .......... 358/1.15 |
| 2004/0207862 A1 | 10/2004 | Such et al. |
| 2005/0005047 A1 | 1/2005 | Kenney et al. |
| 2005/0030557 A1 | 2/2005 | Wiechers |
| 2005/0030570 A1 | 2/2005 | Wiechers et al. |
| 2005/0030577 A1 | 2/2005 | Wiechers |
| 2005/0043846 A1 | 2/2005 | Wiechers |
| 2005/0043847 A1 | 2/2005 | Wiechers |
| 2005/0043848 A1 | 2/2005 | Wiechers |
| 2006/0232805 A1 | 10/2006 | Holub |

FOREIGN PATENT DOCUMENTS

| | | |
|---|---|---|
| EP | 1 262 748 A2 | 12/2002 |
| EP | 1 333 372 | 8/2003 |
| JP | 11-103386 | 4/1999 |
| JP | 11-338928 | 12/1999 |
| JP | 2000-047988 | 2/2000 |
| JP | 2001-243024 | 9/2001 |
| JP | 2002-135488 | 5/2002 |
| JP | 2002-182883 | 6/2002 |
| JP | 2002-316467 | 10/2002 |
| JP | 2002-342318 | 11/2002 |
| JP | 2002-351865 | 12/2002 |
| JP | 2003-143394 | 5/2003 |
| JP | 2003-263291 | 9/2003 |
| JP | 2004-252248 | 9/2004 |
| JP | 2004-295602 | 10/2004 |
| WO | 01/82104 | 11/2001 |
| WO | 01/82224 | 11/2001 |
| WO | 02/33530 | 4/2002 |
| WO | 2006/019748 | 2/2006 |

* cited by examiner

PRINTING MANAGEMENT SYSTEM

FIELD OF THE INVENTION

The present invention relates to a remote proof printing system and method. In particular, the present invention relates to a system and method to obtain printing proofs remotely by using proof printers distributed on an information network.

BACKGROUND OF THE INVENTION

It is common to provide a sample of an image to a customer for approval prior to printing a large number of copies of the image using a high volume output device such as a printing press. The printed sample image is known as a "proof," which is used to ensure that the customer is satisfied with, among other things, the content and color of the image. Proofs are not printed on high volume output devices because high volume output devices are expensive to set up and not cost effective to print proofs. Accordingly, it has become a practice in the printing industry to use digital color printers, also called "proofers," to print proofs since they are cost effective and may be color adjusted and confirmed. Proofers render color prints of images that have been encoded in the form of digital data, which includes code values indicating the colors to be printed. When the proofer generates a printed output of an image, it is intended that the image rendered on the printed output will exhibit the exact colors that will ultimately be rendered by the high volume output device.

Prior to printing, a calibration device, such as a spectrophotometer, may be used to measure the colors of color patches in a test image, each color patch in the test image having an associated "color target" value. The measured color of each color patch is converted into a color code value and then compared against the original "color target" value associated with that patch. This is used to verify that the proofer is correctly rendering the digital information as the correct intended colors.

Color management adjustments are used to modify the operation of the proofer so that the image printed by the proofer will have the same appearance as that printed by the high volume output device. A first step in color management is to determine how the high volume output device converts color code values into printed colors. This determining step is known as "characterization" of the high volume printing device. A second step is to similarly determine how the proofer device converts color code values into printed colors. This is known as "characterization" of the proofer device. The proofer characterization generally depends on the specific proofer, the ink, and the media used on that particular proofer. In both of these cases, the result of such a characterization step is known as a "color profile." In order to make the proof, one needs to use both the proofer color profile and the color profile of the high volume printing device, together with a number of color settings, in order to achieve the desired match. Achieving the correct color output requires that a specific combination of profile(s), color settings, printer, ink, and media all be used in combination.

With the advent of information networking as a basis of communication in the field of industrial printing, the need to perform remote proofing over networks has increased. The need for the color profile and other such information for a proof printer, while already complex in the case of a single printer and its computer controller, becomes much more demanding and subject to error in the case of remote proofing. The situation is rendered even more complex when proofing printers are placed on a network comprising a plurality of proof printers and a plurality of master proofing controllers. Complexities involved in remote proofing include the proofer-specific behavior and the management thereof over distance and through security mechanisms and arrangements, such as information network firewalls.

Consequently, there is a need for a method and system that allows one or more master proofing controllers to conduct remote proofing over an information network with one or more remote proof printers that are capable of one or more printer settings, wherein the one or more master proofing controllers may obtain verification that the one or more remote proof printers are rendering correct colors.

SUMMARY OF THE INVENTION

The present invention provides a method and system that allows one or more networked controllers, configured to be master proofing controllers, to conduct remote proofing over an information network with one or more remote proof printers that are capable of one or more printer settings, where the one or more master proofing controllers may obtain verification that the one or more remote proof printers are rendering correct colors.

The present invention provides a system and method of use for a remote proofing system, comprising a number of networked controllers, one of which is configured to be a master proofing controller, at least one remote proof printer and an information network, wherein the master proofing controller, the other networked controllers and the at least one remote proof printer are coupled to the information network. The master proofing controller is configured to monitor at least one monitored information folder (MIF). The master proofing controller can be configured to monitor at least one monitored information folder group (MIFG), the monitored information folder group MIFG comprising a plurality of monitored information folders (MIF). The master proofing controller optionally displays a collection of printer instructions (PIs) associated with members of the monitored information folder group (MIFG). The master proofing controller can designate one member of the monitored information folder group (MIFG) as a master monitored information folder (MMIF) and can modify printer instructions (PIs) associated with the members of the MIFG to be the same as printer instructions (PIs) associated with the MMIF. The remote proofing system can further comprise a spectrophotometer coupled to the remote proof printer for providing spectral data to the remote proof printer for the master proofing controller.

The master proofing controller and the remote proof printer can be separated from each other by an information firewall through which the master proofing controller instructs the remote proof printer based on a multilevel authorization obtained from an authority controlling the remote proof printer or the firewall or both. The master proofing controller is configured to accept a software token for the authorization via e-mail, file transfer protocol or hypertext transfer protocol.

Further embodiments of the remote proofing system allow for performing print proofing through an information firewall via layered authorization from the operator of the remote proof printer. Yet further embodiments allow for multiple and partially overlapping remote proofing systems on the same information network.

BRIEF DESCRIPTION OF THE DRAWINGS

The present invention will be more readily understood from the detailed description of exemplary embodiments presented below considered in conjunction with the attached drawing.

It is to be understood that the attached drawings are for purposes of illustrating the concepts of the invention.

DETAILED DESCRIPTION OF THE INVENTION

Figure 1:
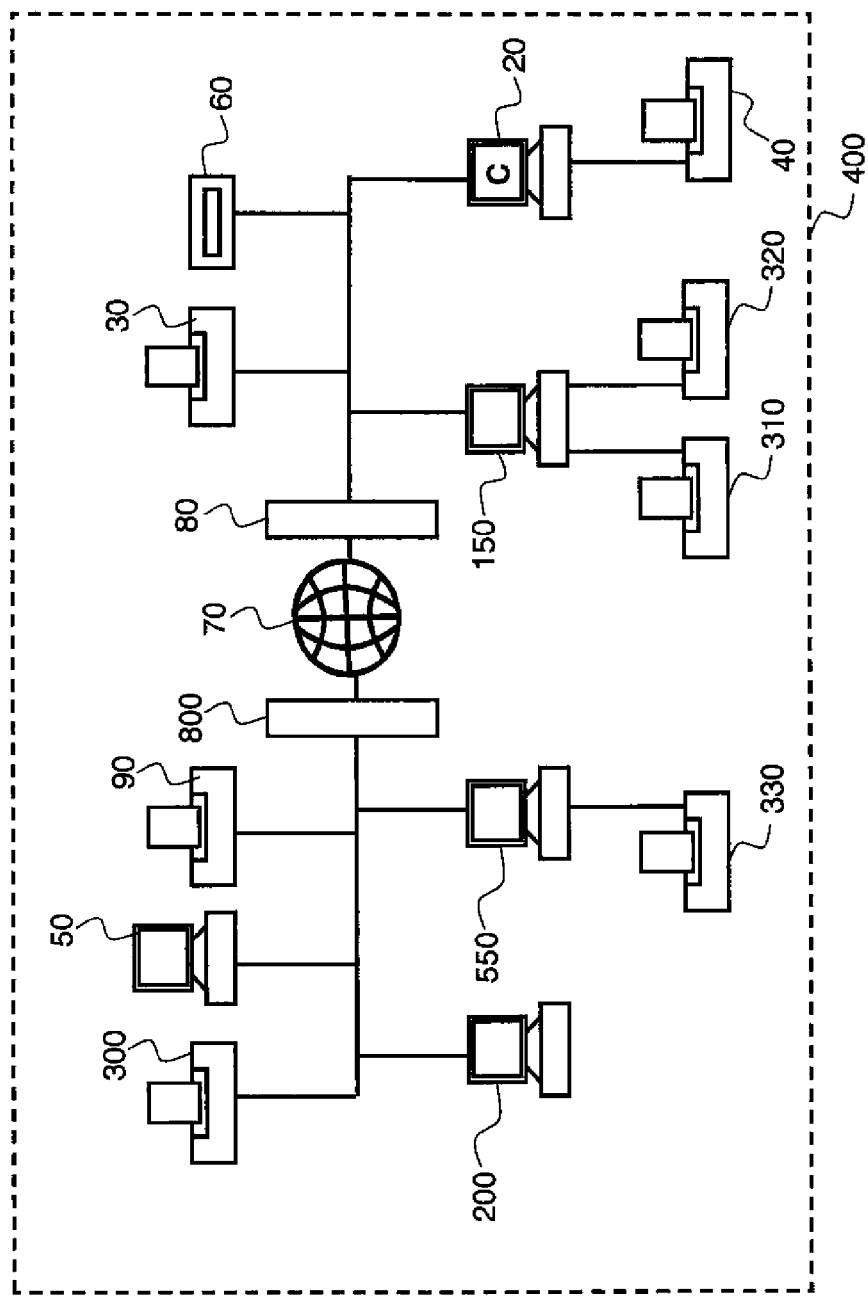
FIG. 1 is a block diagram of a remote proofing system operating over an information network.
Figure 2:
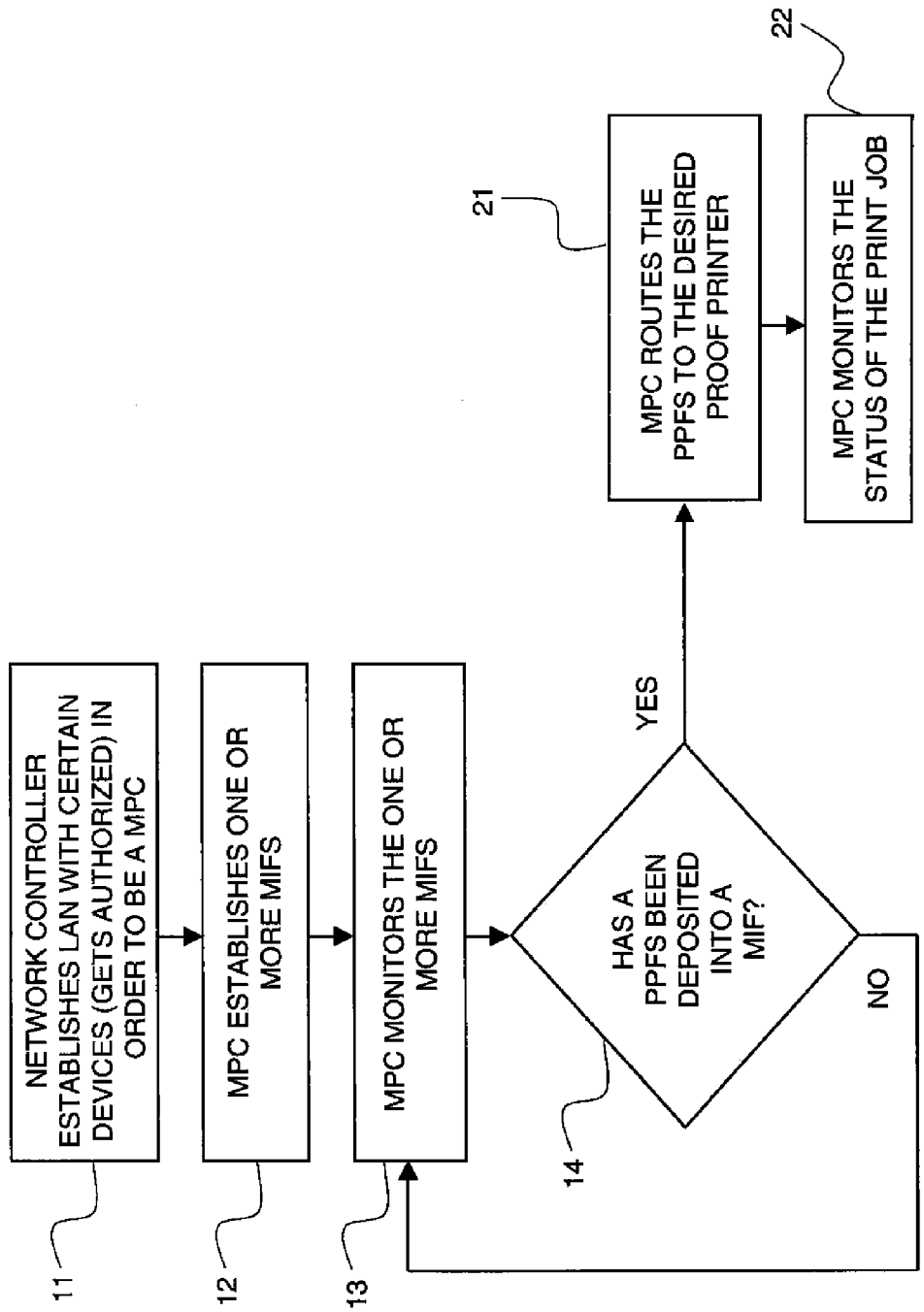
FIG. 2 is a flow chart of the operation of the monitored information folders of the remote proofing system.

Referring to FIG. 1, a remote proofing system includes networked controller 20 configured to be a master proofing controller (hereinafter master proofing controller 20 or MPC 20) and at least one remote proof printer 30, 90, 300, 310, 320, 330 on information network 400. Proof printer 30, 90, 300, 310, 320, 330 may have associated with it a spectrophotometer to evaluate the colors that it renders. Referring to FIG. 2, the configuring 11 of a networked controller to be a MPC is done in software, for example, by a user configuring their own information network with the network controller. Information network 400 may be a local network or a wide area network and may employ communication over Internet segment 70 and may employ one or more information firewall 80, 800 to secure information and control access across Internet segment 70. Information network 400 may further include one or more further networked controller 50, 150, 200, 550. The one or more networked controller 50, 150, 200, 550 is configurable as a master proofing controller. Networked controllers 50, 150, 200, 550 and master proofing controller 20 are a type of controlling device, including, but not limited to, a personal computer employing a computer operating system, including, but not limited to, Windows (including variants), Linux, Macintosh, UNIX and DOS. Information network 400 may further include proof printers that are local to the networked controllers. By way of example, proof printers 310, 320 are local to networked controller 150, but may be accessible to master proofing controller 20 over information network 400. The term "remote proof printer" is used to describe a proof printer that is not local to master proofing controller 20 and which is accessible on information network 400, either through being connected directly to information network 400 or by being accessible through a networked controller such as network controller 150.

A remote proof printer may be accessible to the master proofing controller 20 through a networked controller. For example, remote proof printer 330 is accessible to master proofing controller 20 through networked controller 550. A remote proof printer, for example, remote proof printers 30, 90, 300, may reside directly on information network 400. A remote proof printer may topologically be connected directly to information network 400, as is the case for remote proof printer 30, 90, 300, but access to it may nevertheless be controlled by a networked controller, such as, for example 50, 150, 200, 550. However, while one networked controller may control a plurality of remote proof printers, the remote proof printers being either directly connected to it or connected directly to information network 400, every remote proof printer is controlled by a maximum of one networked controller, which networked controller is capable of granting other networked controllers and master proofing controllers access to the remote proof printers under its control. For example, networked controller 150 may grant other network controllers and master proofing controller 20 access to remote proof printers 310 and 320. In a further example, network controller 50 may control access to remote proof printers 90 and 300 (when it controls them) and may grant such access to other networked controllers and master proofing controller 20. There may be a local proof printer 40 in direct non-networked communication with the at least one master proofing controller 20. Printers 30, 40, 90, 300, 310, 320, 330 may use any type of printer protocol, such as AppleTalk, LPR, Internet Printing Protocol or the like.

While networked controllers 50, 150, 200, 550 and master proofing controller 20 may have their own information storage devices, the network may have one or more network information storage device 60, including, but not limited to, a network hard disk drive Any of the controllers, printers and information storage devices on information network 400 may have their own restrictions imposed in regard to what source they accept information from or grant access to. For example, there may be access restrictions in regard to which master proofing controller 20 and controllers 50, 150, 200, 550 may print to proof printers 30, 90, 300, 310, 320, 330 and local proof printer 40; which controllers 50, 150, 200, 550 or master proofing controller 20 may access storage devices 60 and which controllers 50, 150, 200, 550 or master proofing controller 20 may access data on other controllers (not shown).

Master proofing controller 20 is capable of establishing 12 and monitoring 13 at least one monitored information folder (MIF), also known in the industry as a "hot folder." The at least one MIF is monitored by master proofing controller 20 and may reside in master proofing controller 20, in any one of the networked controllers 50, 150, 200, 550 or on any network information storage device 60. The term "monitoring" is used to describe the monitoring action by the master proofing controller 20 of the MIF, irrespective of whether master proofing controller 20 does so directly or whether it does so via another networked controller 50, 150, 200, 550. The term "monitoring" further includes not only monitoring the MIF for the purposes of determining whether (FIG. 2) a proof printer file set (PPFS) has been deposited 14 in the MIF where, upon detection, the PPFS is routed 21 to its respective proof printer, but also monitoring the status 22 of the actual printing process, including, but not limited to, file processing, printer progress and spectrophotometer measurement results from proof printer 30, 90, 300, 310, 320 330. For example, referring to the block diagram of FIG. 3, master proofing controller 20 is monitoring one or more of MIF2. The at least one MIF2 may reside in master proofing controller 20, in any one of networked controller 50, 150, 200, 550 or in network information storage 60. The term "monitoring" is used to describe the monitoring action by the master proofing controller 20 of any one or more of the MIF2, irrespective of whether master proofing controller 20 does so directly or whether it does so by using another networked controller 50, 150, 200, 550. The term "monitoring" further includes not only monitoring one or more of the MIF2 for the purposes of determining whether PPFS 7 has been deposited into one of the MIF2, but also monitoring the status of the actual printing process, including, but not limited to, file processing, printer progress and spectrophotometer measurement results from proof printer 30, 90, 300, 310, 320 330.

Information network 400 may employ any suitable information communication medium and any suitable information communication protocol, subject to the condition that the information communication medium and information communication protocol allow master proofing controller 20 to monitor at least one MIF2 and allow master proofing controller 20 to print on any remote proof printer 30, 90, 300, 310, 320, 330, whether directly or via another networked controller 550, as is the case with remote proof printer 330. Suitable information communication media include, but are not limited to, wired, radio, microwave, satellite and optical media. Suitable forms for wired information communication media include, but are not limited to, Ethernet, Coaxial cable, twisted pair and telephone. Suitable information communication protocols include, but are not limited to, TCP/IP and IPX.

A set of printer instruction (PI) is associated with each MIF. The set of printer instructions may include, but are not limited to, media configurations, color profiles, layouts for the information to be printed and file processing instructions. Media configurations may include, but are not limited to, paper selection, ink type selection, resolution, screening tables, inking levels, inking limits, grey balance and spectrophotometer information. For example, referring to the block diagram in FIG. 3, a set of printer instruction (PI) 4 is associated with each MIF2.

Proof printer 30, 90, 300, 310, 320, 330 may have associated with it a spectrophotometer to evaluate the colors that it renders. In such case, referring to FIG. 3, proof printer 30, 90, 300, 310, 320, 330, transmits to master proofing controller 20 the results of a color evaluation performed by proof printer 30, 90, 300, 310, 320, 330 over information network 400 for a proof that it has printed. In the case of remote proof printers 310, 320, the results may be transmitted by networked controller 150 and in the case of remote proof printer 330 the results may be transmitted by networked controller 550.

Figure 3:
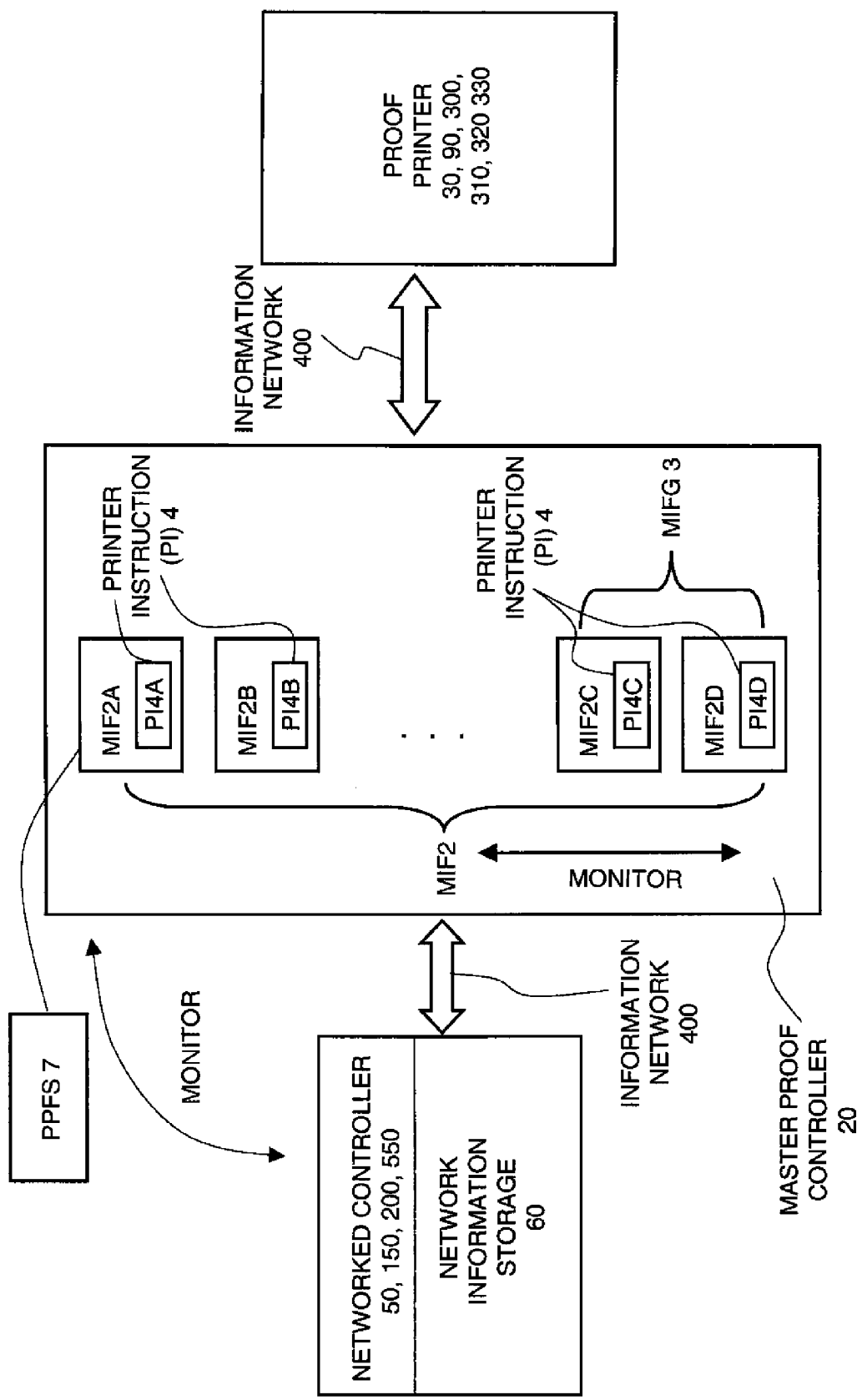
FIG. 3 is a functional diagram of the remote proofing system operation.

Referring to FIG. 2 and FIG. 3, master proofing controller 20 may monitor 13 one or more MIFs on information network 400, (Option I) associate 15 a set of printer instructions with a member of the one or more MIFs, associate 16 a subset of the MIFs to form a monitored information folder group (MIFG), designate 17 one MIF of the MIFG to be a master MIF (MMIF), change 18 the printer instructions associated with the MIF in the MIFG to be the same as the printer instructions associated with the MMIF, and optionally display 19 one or more of the printer instructions associated with the members of the MIFG in the form of a table or array. Thereafter, Option II is followed. For example, referring to FIG. 3, master proofing controller 20 may monitor one or more MIF2 on information network 400, associate a set of printer instructions 4C with a member of the one or more MIF2, here MIF2C, associate a subset of the MIF2 to form a monitored information folder group (MIFG), MIFG3, designate one MIF, MIF2C, of the MIFG3 to be a master MIF (MMIF), change the printer instructions 4D associated with the MIF2D in the MIFG3 to be the same as the printer instructions (PI) 4C associated with the MMIF, here, MIF2C, and optionally display one or more of the printer instructions associated with the members of the MIFG3 in the form of a table or array.

When a PPFS containing information to be printed as an image is deposited into a MIF monitored by a master proofing controller, the master proofing controller detects and routes the PPFS to the proof printer corresponding to the MIF. For example, referring to FIG. 2 and FIG. 3, when PPFS7 containing information to be printed as an image is deposited into a MIF2A monitored 13 by master proofing controller 20, master proofing controller 20 detects 14 and (Option II) routes 21 the PPFS7 to the proof printer corresponding to the MIF2A.

Referring to FIG. 1, where master proofing controller 20 is to print to remote proofing printer 30, there is no requirement to pass through firewall 80, 800 and access for master proofing controller 20 to remote proofing printer 30 is provided by an authority in control of the proofing controller that operates the remote proofing printer 30, via either networked controller 150 or networked controller 20.

With firewalls 80, 800 in place, master proofing controller 20 must be "authorized" by the authority in control of firewall 800 and by the authority in control of master proofing controllers in control of printer 90, 300, 330 in order to print to remote proof printer 90, 300, 330. An authority in control of master proofing controller 20 must first send an "authorization request" to the authority in control of remote proof printer 90, 300, 330, to get authorization to communicate through firewall 800 and print to proof printer 90, 300, 330, respectively. To authorize master proofing controller 20, an authority in control of remote proof printer 90, 300, 330 will send a "grant" back to master proofing controller 20. Now, the authority in control of master proofing controller 20 may "accept" or "deny" the grant message. If the authority in control of master proofing controller 20 accepts the grant message, master proofing controller 20 may print to proof printer 90, 300, 330. If the authority in control of master proofing controller 20 denies the grant message, master proofing controller 20 will not be able to print to proof printer 90, 300, 330. The access request to the authorities in control of firewall 800 and of remote proof printer 90, 300, 330 is performed by conventional methods known in the art, such as, for example, e-mail.

The authorization request, grant and accept may be performed, such as, for example, on the basis of a software token or software key exchange between an authority in control of master proofing controller 20 and an authority in control of firewall 800 and an authority in control of remote proof printer 90, 300, 330. The authorization procedure may comprise of a plurality of levels of authorization, dictated by the authority in control of remote proofing printer 90, 300, 330, each level of authorization allowing master proofing controller 20 access to a different subset of functions for remote proof printer 90, 300, 330. For example, at a lowest level of authorization, only work originating from the particular master proofing controller 20 is visible to the authority in control of master proofing controller 20, whereas at the highest level of authorization, all work on proof printer 90, 300, 330 is visible to the authority in control of master proofing controller 20. The authorization mechanisms may be obtained by any one or more authorization mechanism delivery system (AMDS), including, but not limited to, electronic mail, file transfer protocol (ftp), and hypertext transfer protocol (http and https).

Figure 5:
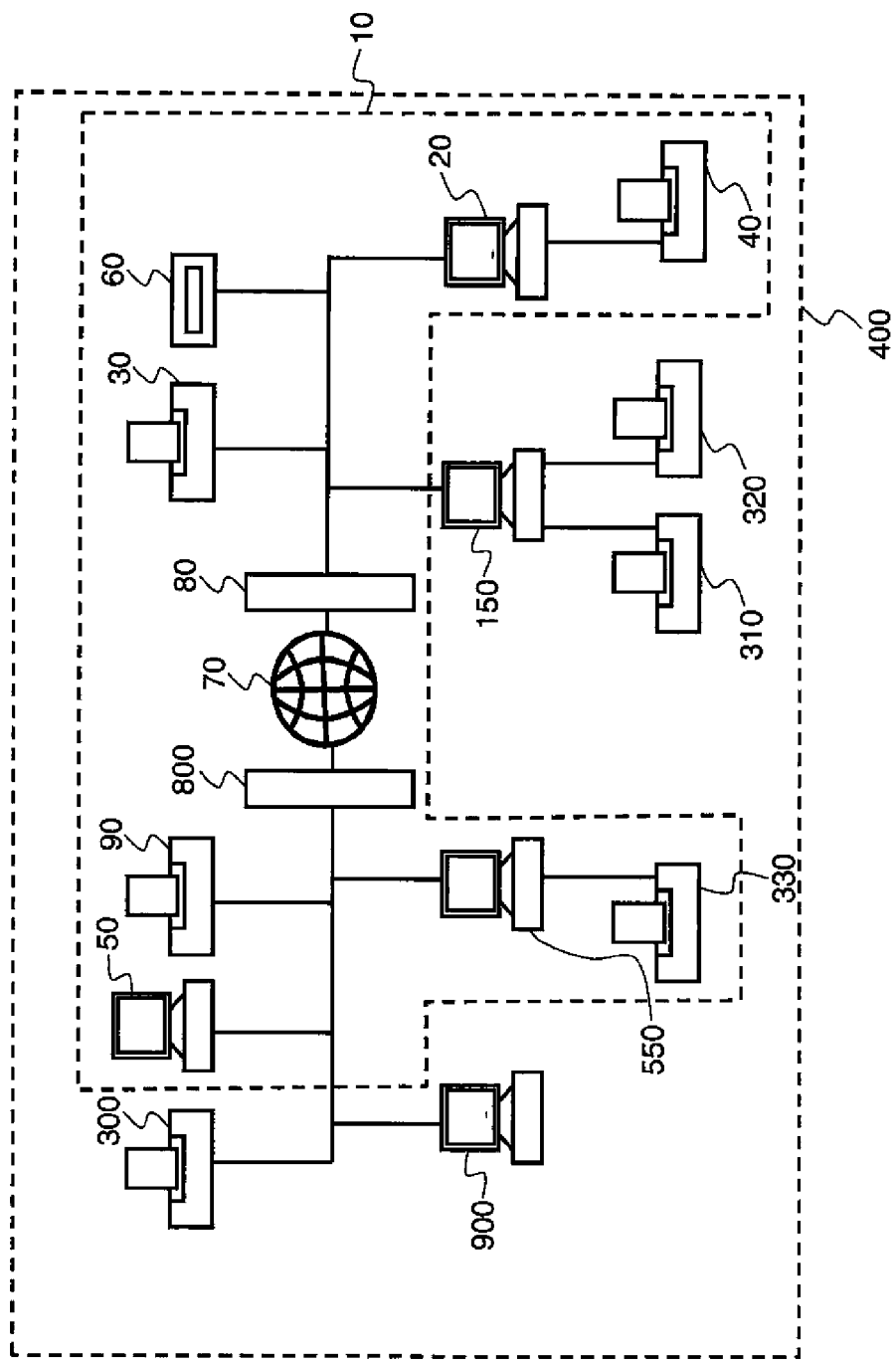
FIG. 5 is a block diagram of a first remote proofing system operating as an authorized subset over the information network with a firewall.

In FIG. 5, which is an extension of the prior Figures, remote proofing system 10 includes master proofing controller 20 in communication with an authorized subset of network devices on information network 400. The authorized subset of network devices includes at least one remote proof printer 30, 90, 330, and at least one networked controller 50, 550. Master proofing controller 20 is specifically authorized by the method described above to have access to only remote proofing system 10. The configuring of a networked controller to be a master proofing controller 20 is done in software, as described above. Remote proofing system 10 includes only one master proofing controller in the form of master proofing controller 20. All of the networked controllers 20, 50, 550 in remote proofing system 10 are programmed with the same remote proofing system software, but, at any one time, only one networked controller may be configured to be a master proofing controller which, in the example of FIG. 5, is master proofing controller 20.

Information network 400 may include a network controller that is configured to be master proofing controller 900, which is not a part of the authorized subset of network devices to which master proofing controller 20 has access and is thereby not a part of remote proofing system 10.

Figure 6:
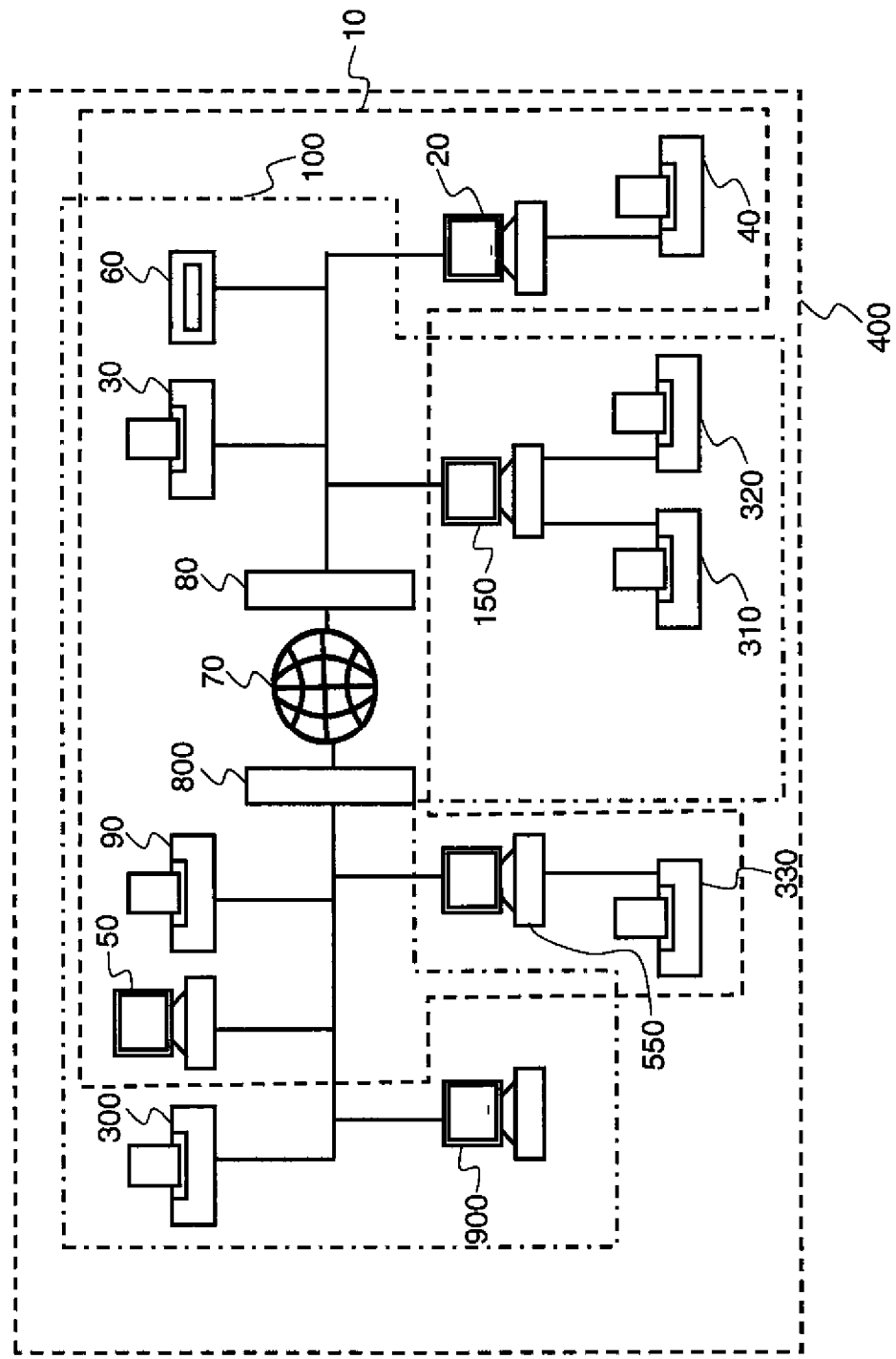
FIG. 6 is a block diagram of a first and a second remote proofing system operating as authorized subsets, respectively, over the information network with a firewall.

In FIG. 6, which is an extension of prior FIG. 1 and FIG. 5, information network 400 may contain a plurality of remote proofing systems. By way of example, FIG. 6 shows the specific case of two remote proofing systems 10 and 100. Remote proofing system 10 is the same remote proofing system 10 as in FIG. 5, while remote proofing system 100 includes networked controller 900 configured to be master proofing controller (hereinafter master proofing controller 900) in communication with its own authorized subset of network devices on information network 400. Master proofing controller 900 is specifically authorized to have access to only its authorized subset of network devices.

In this embodiment, the two remote proofing systems 10, 100 are shown as overlapping in part. Remote proofing systems 10, 100 share remote proof printers 30, 90, networked controller 50, network storage device 60, internet segment 70 and firewalls 80, 800; however, only remote proofing system 100 has authorized access to remote proof printer 300, 310, 320 and their associated MIFs, and networked controller 150 and only remote proofing system 10 has access to local proof printer 40 in direct non-networked communication with master proofing controller 20, networked controller 550, and remote proof printer 330. Each remote proofing system 10, 100 has its own distinct master proofing controller 20, 900, respectively, each of master proofing controller 20 and master proofing controller 900 thereby being an unshared master proofing controller.

Remote proofing system 10 and 100 both include remote proof printer 30 and 90. Therefore, master proofing controllers 20 and 900 both have authorized access to remote proof printer 30 and 90. Remote proof printers 30 and 90 have different associated MIFs in remote proofing system 10 and remote proofing system 100. Additionally, master proofing controller 20 may store its MIF for remote proof printer 30, 90 on a different information storage device from the information storage device on which master proofing controller 900 is storing its MIF for remote proof printer 30, 90.

As already explained above, the authorization procedure may comprise of a plurality of levels of authorization, dictated by the authority in control of remote proofing printer 30, 90, each level of authorization allowing master proofing controller 20, 900 access to a different subset of functions for remote proof printer 30, 90. For example, at a lowest level of authorization, only work originating from master proofing controller 20 may be visible to the operator of master proofing controller 20 and only work originating from master proofing controller 900 is visible to the operator of master proofing controller 900, whereas, at the highest level of authorization, all work on printer 30, 90 may be visible to the operators of both master proofing controllers 20, 900. Each proofer may grant a unique access level to each master proofing controller it grants access to.

Figure 4:
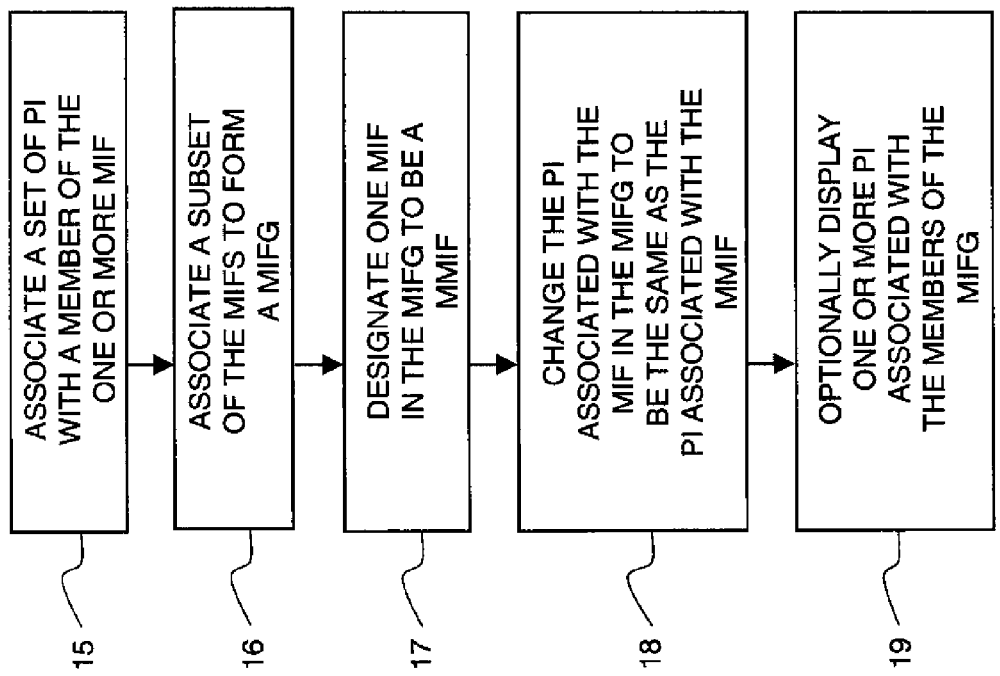
FIG. 4 is a flow chart of the process for setting a master monitored information folder.

In yet a further embodiment of the present invention, shown in FIG. 4, which is an extension of FIGS. 1, 5 and 6, networked controller 900, being common to both remote proofing system 500 and remote proofing system 100, is a networked controller within remote proofing system 500 and it is also the unique master proofing controller 900 for remote proofing system 100. All other elements of remote proofing system 500 are the same as those of remote proofing system 10 in the embodiment shown in FIG. 6. The configuring of a networked controller 900 of remote proofing system 500 to be a master proofing controller 900 for remote proofing system 100 is done in software, as already described here.

Figure 7:
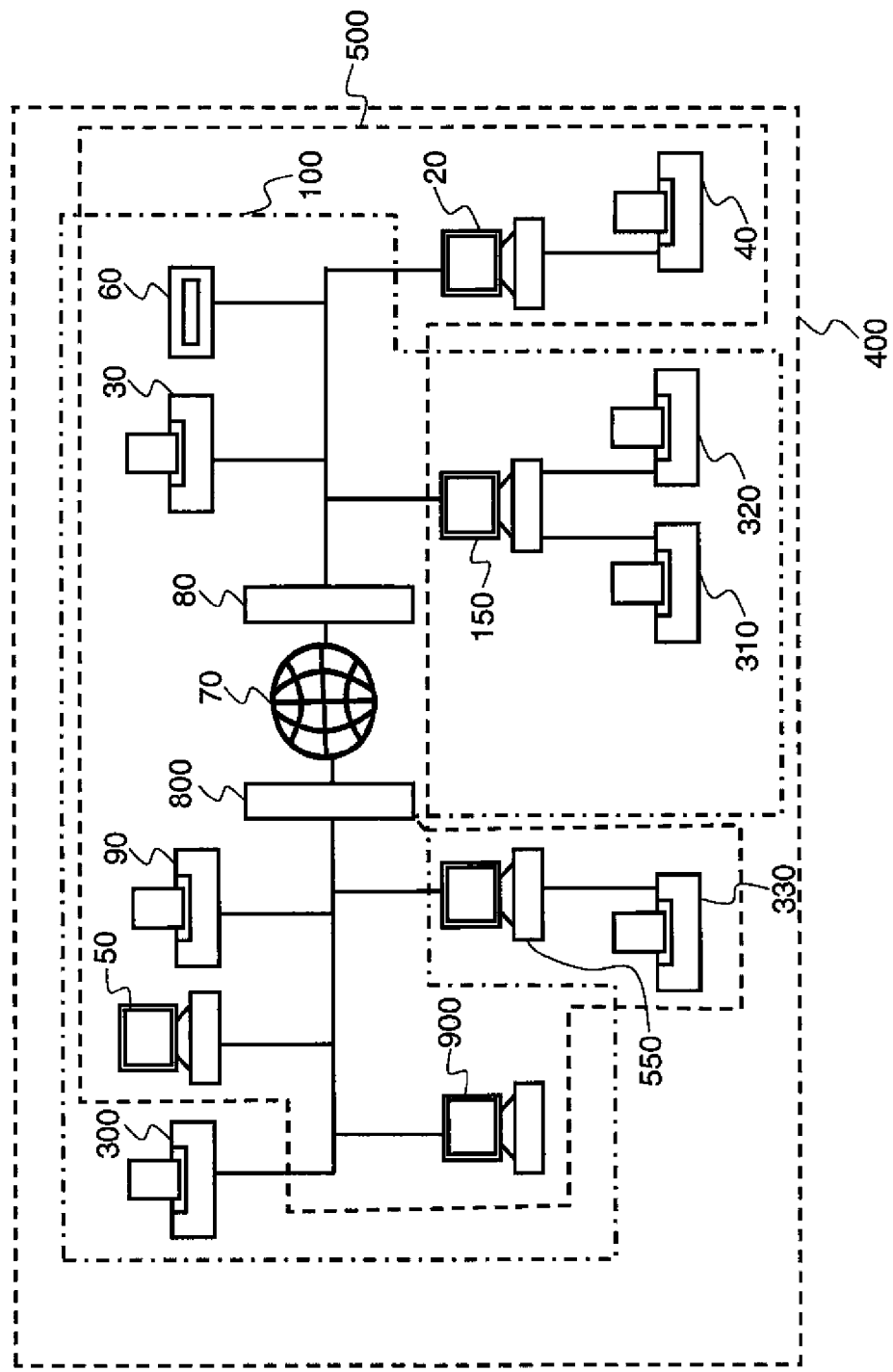
FIG. 7 is a block diagram of first and second remote proofing systems, the first remote proofing system having a networked controller that is configured to be a master proofing controller for the second remote proofing system.

In a further aspect of the present invention, see FIG. 6 and FIG. 7, as an alternative to monitoring a MIF, MPC 900 establishes a connection with a digital front end (DFE) that is installed and operating on networked controller 50 located on the same side of firewall 800 as MPC 900. MPC 900 then monitors the DFE on networked controller 50 for a PPFS that is forthcoming from the DFE. The term "digital front end" (DFE) is used here to describe a software package operating on a computer workstation and which comprises at least a raster image processor (RIP). Suitable examples of a DFE include Prinergy from Eastman Kodak of Rochester, N.Y., Apogee from Agfa-Gevaert of Mortsel, Belgium and Prinect MetaDimension from Heidelberg Drückmaschinen of Heidelberg, Germany. Networked controller 50, being a workstation with a DFE implemented on it, is a part of both remote proofing system 10 and remote proofing system 100, but only MPC 900 can establish a connection with the DFE on networked controller 50 and monitor it for a PPFS. All other aspects of the apparatus of FIG. 6 and FIG. 7 remain the same as in the case of the use of a MIF or MIFG, and the steps of FIG. 2 and FIG. 4 proceed as with an MIF, with the PPFS in this case being forthcoming from the DFE instead of from a MIF. The steps of FIG. 3, however, do not apply to the case of MPCs monitoring DFEs and no grouping of DFEs is performed.

It is to be understood that the embodiments contained herein are merely illustrative of the present invention and that many variations of the above-described embodiments may be devised by one skilled in the art without departing from the scope of the invention. It is therefore intended that all such variations be included within the scope of the following claims and their equivalents.

PARTS LIST 10 remote proofing system
11 configure network controller
12 MPC establishes monitored information folder (MIF)
13 MPC monitors MIF
14 determine if proof printer file set (PPFS) deposited in MIF
15 associate set of printer instructions (PI) with member of MIF
16 associate subset of MIF to form monitored information folder group (MIFG)
18 change PI associated with MIF to MIFG to be same as PI associated with MMIF
19 optionally display PI associated with MIFG
20 master proofing controller (MPC)
21 PPFS routed to respective proof printer
22 monitor status of printing process
30 proof printer
40 proof printer
50 networked controller
60 information storage device
70 Internet segment
80 information firewall
90 proof printer
100 remote proofing system 150 networked controller
200 networked controller
300 proof printer
310 proof printer
320 proof printer
330 proof printer
400 information network
500 remote proofing system
550 networked controller
800 information firewall
900 master proofing controller

The invention claimed is:

1. A remote proofing system, comprising:
a master proofing controller;
at least one remote proof printer;
an information network, wherein the master proofing controller and the at least one remote proof printer are coupled to the information network and the master proofing controller is configured to monitor at least one monitored information folder (MIF);
wherein the master proofing controller and the at least one remote proof printer are separated from each other by an information firewall;
wherein the master proofing controller instructs the at least one remote proof printer through the information firewall based on an authorization obtained from an authority;
wherein the master proofing controller is configured to accept a software token for the authorization; and
wherein the remote proofing system receives the software token by electronic mail.

2. The remote proofing system according to claim 1, wherein the authority controls the at least one remote proof printer.

3. The remote proofing system according to claim 1, wherein the authority controls the information firewall.

4. The remote proofing system according to claim 1, wherein the authority controls the at least one remote proof printer and the information firewall.

5. The remote proofing system according to claim 1, wherein the authorization includes one or more levels of access.

6. The remote proofing system according to claim 1, further comprising a spectrophotometer coupled to the at least one remote proof printer for providing spectral data to the at least one remote proof printer for the master proofing controller.

7. The remote proofing system according to claim 1, wherein the master proofing controller is configured to monitor at least one monitored information folder group (MIFG), the monitored information folder group MIFG comprising a plurality of monitored information folders (MIF).

8. The remote proofing system according to claim 7, wherein the master proofing controller designates one member of the at least one monitored information folder group (MIFG) as a master monitored information folder (MMIF).

9. The remote proofing system according to claim 8, wherein the authorization includes one or more levels of access.

10. A remote proofing system, comprising:
a master proofing controller;
at least one remote proof printer;
an information network, wherein the master proofing controller and the at least one remote proof printer are coupled to the information network and the master proofing controller is configured to monitor at least one monitored information folder (MIF);
wherein the master proofing controller and the at least one remote proof printer are separated from each other by an information firewall;
wherein the master proofing controller instructs the at least one remote proof printer through the information firewall based on an authorization obtained from an authority;
wherein the master proofing controller is configured to monitor at least one monitored information folder group (MIFG), the monitored information folder group MIFG comprising a plurality of monitored information folders (MIF);
wherein the master proofing controller designates one member of the at least one monitored information folder group (MIFG) as a master monitored information folder (MMIF); and
wherein the master proofing controller modifies printer instructions (PIs) associated with the members of the MIFG to be the same as printer instructions (PIs) associated with the MMIF.

11. An information system, comprising:
a plurality of remote proofing systems, wherein each remote proofing system contains one unshared master proofing controller;
at least one remote proof printer and an information network, wherein the one unshared master proofing controller and at least one remote proof printer are coupled to the information network;
wherein the at least one remote proof printer is printed to by one or more of the unshared master proofing controller;
wherein the master proofing controller and the at least one remote proof printer are separated from each other by an information firewall;
wherein the master proofing controller is configured to accept a software token for authorization; and
wherein the remote proofing system receives the software token by electronic mail.

12. The information system according to claim 11, further comprising a spectrophotometer coupled to the at least one remote proof printer for providing spectral data from the at least one remote proof printer to the unshared master proofing controller associated with the at least one remote proof printer.

13. The remote proofing system according to claim 11, wherein the one unshared master proofing controller is configured to monitor at least one monitored information folder group (MIFG), the monitored information folder group MIFG comprising a plurality of monitored information folders (MIF).

14. The remote proofing system according to claim 13, wherein the master proofing controller designates one member of the at least one monitored information folder group (MIFG) as a master monitored information folder (MMIF).

15. The remote proofing system according to claim 14, wherein the master proofing controller modifies printer instructions (PIs) associated with the members of the MIFG to be the same as printer instructions (PIs) associated with the MMIF.

16. The remote proofing system according to claim 11, wherein the master proofing controller designates one member of the at least one monitored information folder group (MIFG) as a master monitored information folder (MMIF).

17. The remote proofing system according to claim 16, wherein the master proofing controller modifies printer instructions (PIs) associated with the members of the MIFG to be the same as printer instructions (PIs) associated with the MMIF.

18. The remote proofing system according to claim 11, wherein the master proofing controller instructs the at least one remote proof printer through the information firewall based on authorization obtained from an authority.

19. The remote proofing system according to claim 18, wherein the authority controls the at least one remote proof printer.

20. The remote proofing system according to claim 18, wherein the authority controls the information firewall.

21. The remote proofing system according to claim 18, wherein the authority controls the at least one remote proof printer and the information firewall.

* * * * *